United States Statutory Invention Registration [19]

[11] Reg. Number: H506

Asada et al. [43] Published: Aug. 2, 1988

[54] RESINOUS COMPOSITION AND PROCESS FOR PRODUCING SHAPED ARTICLES USING SAME

[75] Inventors: Masashiro Asada; Junji Takase, both of Kobe, Japan

[73] Assignee: Kanegafuchi Kagaku Kogyo Kabushiki Kaisha, Osaka, Japan

[21] Appl. No.: 39,828

[22] Filed: Apr. 17, 1987

Related U.S. Application Data

[63] Continuation of Ser. No. 703,566, Feb. 20, 1985, abandoned.

[30] Foreign Application Priority Data

Feb. 20, 1984 [JP] Japan ..... 59-31050

[51] Int. Cl.[4] ..... C08K 5/52; C08L 67/02; C08G 63/18

[52] U.S. Cl. ..... 524/128; 524/399; 524/400; 524/604; 524/605; 528/193

[58] Field of Search ..... 524/128, 399, 400, 605, 524/604; 528/193

[56] References Cited

U.S. PATENT DOCUMENTS

| | | | |
|---|---|---|---|
| 3,053,795 | 9/1962 | Coover et al. | 524/128 |
| 3,404,121 | 10/1968 | Barkey | 524/604 |
| 3,516,957 | 6/1970 | Gray et al. | 524/315 |
| 3,576,920 | 4/1971 | Friedman | 524/147 |
| 3,684,766 | 8/1972 | Jackson et al. | 528/176 |
| 3,907,939 | 9/1975 | Robin et al. | 524/128 |
| 3,949,024 | 4/1976 | Beck et al. | 524/605 |
| 4,097,431 | 6/1978 | Asahara et al. | 528/605 |
| 4,123,420 | 10/1978 | Kyo et al. | 528/127 |
| 4,191,681 | 3/1980 | Stackman et al. | 528/193 |
| 4,412,057 | 10/1983 | Asada et al. | 528/193 |
| 4,438,241 | 3/1984 | Mark et al. | 528/176 |
| 4,477,647 | 10/1984 | Mark et al. | 528/193 |
| 4,552,947 | 11/1985 | Iwakiri et al. | 528/193 |

*Primary Examiner*—John F. Terapane
*Assistant Examiner*—J. E. Thomas
*Attorney, Agent, or Firm*—Sughrue, Mion, Zinn, Macpeak & Seas

[57] ABSTRACT

Disclosed is a resinous composition having excellent discoloration, processability, heat resistancy and durability comprising, A. 100 parts by weight of an aromatic polyester having the general formulae (I) and (II)

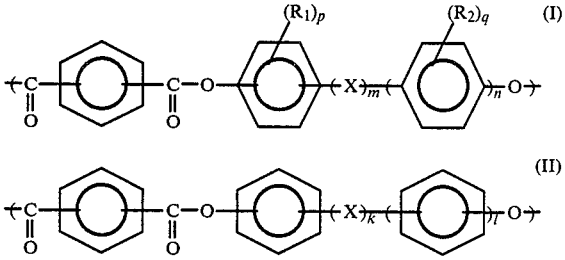

B. 0.01 to 5 parts by weight of a phosphoric compound, and

C. 0.01 to 0.1 part by weight of a carboxylic acid metal salt. Also disclosed is a process for producing shaped articles, the improvement which comprises adding the additives stepwise to the aromatic polyester.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RESINOUS COMPOSITION AND PROCESS FOR PRODUCING SHAPED ARTICLES USING SAME

This is a continuation of application Ser. No. 703,566, filed Feb. 20, 1985, now abandoned.

BACKGROUND OF THE INVENTION

1. Field of the Invention:

The present invention generally relates to a resinous composition comprising an aromatic polyester, a phosphite compound and a carboxylic acid metal salt and process for production of shaped articles using the foregoing composition. More specifically, it relates to a resinous composition and process for production of shaped articles therefrom comprising the specified aromatic polyester, the specified phosphite compound and the specified organic carboxylic acid metal salt, which is not only improved in discoloration and processability at the time of molding, but long-term resistancy and durability.

2. Description of the Prior Art:

Aromatic polyester polymers are well-known and various processes have been proposed heretofore; (a) an interfacial polymerzation that admixes aromatic dicarboxylic acid dihalides dissolved in an organic solvent non-soluble in water with bisphenols dissolved in an aqueous alkali solution (Examined patent publication No. 1959/65), (b) a solution polymerization in which aromatic dicarboxylic acids are reacted with bisphenols in the presence of an organic solvent (No. 5599/62), (c) an ester interchange process in which aromatic dicarboxylic acids and bisphenols are heated (Nos. 15247/63 and 28119/68), (d) a process of using phase transfer catalysts, etc. Aromatic polyester polymers so prepared have excellent properties including such as heat resistancy, mechanical and electrical properties, so that those are in a widespread use as polymers per se or compositions including shaped articles, films, fibers and the like.

The polymers used in the present invention may be prepared by various processes as aforesaid. The polymers, nontheless, are inferior in processability and necessitate a high plasticizing temperature and a high injecting pressure, from a viewpoint of an extrusion or injection molding. Those also propose a problem of discoloration, when processed, which can not be neglected. Further, aromatic polyester compounds are normally poor in resistancy to hydrolysis. Those polymers, when exposed to high temperature for a long time, suffer from decomposition of main chains to result in a decrease in molecular weight. This phenomenon inevitably leads to a deterioration in properties such as strength of the shaped articles, and therefore an improvement being expected.

In an attempt to overcome such deficiencies, a variety of processes have been proposed, e.g., use of organic phosphines (Non-examined patent publication No. 102042/76), use of phosphorous compounds (No. 100551/77, 134663/77), use of organic carboxylic acid metal salts (No. 152953/77), conjoint use of organic carboxylic acid metal salts and cyclic phosphites (No. 252954/78), conjoint use of carboxylic acid metal salts/epoxy compounds/phosphorous compounds (No. 104654/78), conjoint use of epoxy compounds and phosphorous compounds (No. 104654/78), conjoint use of expoxy compounds and organic carboxylic acid metal salts (No. 84046/78), treatment with reducing agents (No. 30895/76) and so on. In those prior arts, however, mention is only made as to aromatic polyesters comprising terephthalic acid/isophthalic acid and bisphenol A, and satisfactory results are not expected as far as aromatic polyesters, especially those defined by the following general formula (V) stated later.

SUMMARY OF THE INVENTION

It is therefore an object of the present invention to provide a resinous composition which is easy to mold or shape for preparing shaped products.

It is another object of the present invention to provide a shaped article having an improved long-term heat resistancy and durability, which also maintains a high heat distortion temperature.

These and other objects of the present invention together with the advantages thereof will become apparent to those skilled in the art from the detailed disclosure of the present invention as set forth hereinbelow.

An extensive series of studies have been made by the present inventors in order to eliminate such defects as aforesaid and it has been found that when the specific phosphite compound and the specific carboxylic acid metal salt are blended conjointly with the aromatic polyesters used in the present invention, the resulting mixture exhibits excellent processability and provides a shaped article which is heat resistant and durable for a long period of time, while maintaining high heat distortion temperature.

DETAILED DESCRIPTION OF THE INVENTION

Stated more specifically, the present invention encompasses a resinous composition having not only improved discoloration and processability, but excellent heat resistancy and durability, which comprises the components:

A. 100 parts by weight of an aromatic polyester containing recurring structural units of the general formulae (I) and (II),

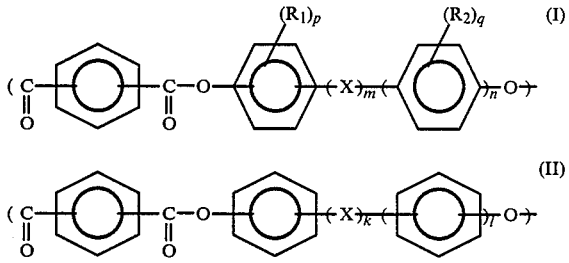

wherein

X=$C_1$–$C_{10}$ alkylene, $C_5$–$C_{15}$ cycloalkylene or cycloalkylidene, —O—, —S—, —CO— or —$SO_2$—

$R_1$,$R_2$=$C_1$–$C_{20}$ alkyl, aryl, ararkyl, alkoxyl, aryloxyl or arylalkoxyl $p$, $q$; $p+q$=integar of 1 to 8 ($1>p$, $q\leqq 4$)

m, n=0 or 1 (if m=1, n≠0)

k, l=0 or 1 (if k=1, l≠0), and molar ratio (I)/(I)+(II)=1–0.01.

B. 0.01 to 5 parts by weight of a phosthite compound, and

C. 0.01 to 0.1 part by weight of a carboxylic acid metal salt.

The present invention further encompasses a process for producing shaped articles having excellent heat resistancy and durability, which comprises the steps of;

blending 100 parts by weight of an aromatic polyester containing recurring structural units of the general formulae (I) and (II) with 0.01 to 5 parts by weight of a phosphite compound, admixing the blend under heat uniformly, extruding and pelletizing the resulting blend, blending the resulting pellets with a carboxylic acid metal salt, and molding the resulting blend.

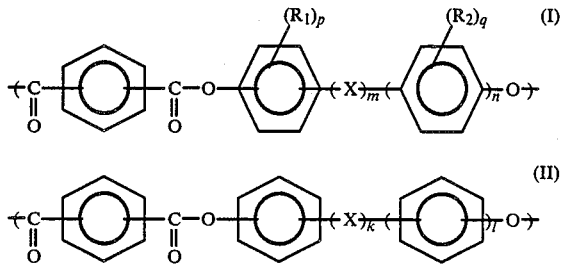

(I)

(II)

wherein

X=$C_1$–$C_{10}$ alkylene, $C_5$–$C_{15}$ cycloalkylene or cycloalkylidene, —O—, —S—, —CO— or —$SO_2$—

$R_1$,$R_2$=$C_1$–$C_{20}$ alkyl, aryl, ararkyl, alkoxyl, aryloxyl or arylalkoxyl p, q; p+q=integer of 1 to 8 ($1 \leqq p, q \leqq 4$)

m, n=0 or 1 (if m=1, $n \neq 0$)

k, l=0 or 1 (if k=1, $l \neq 0$), and molar ratio (I)/(I)+(II)=1–0.01.

The aromatic polyesters to be used in the present invention contain recurring structural units defined by the general formulas (I) and (II). The polymers should preferably have the molar ratio in the polymers of (I) to (I)+(II) ranging from 1 to 0.01. With a view to obtaining polymers with higher heat distortion temperatures, the polymers should preferably have the molar ratio of terephthalic acid (III) to isophthalic acid (IV)+terephthalic acid (III) ranging from 1~0.4, more preferably 1 to 0.9;

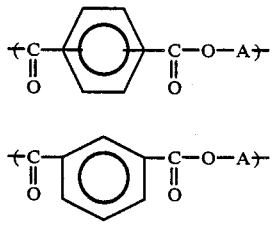

(III)

(IV)

wherein A=bisphenol residue.

More preferably, the recurring structural unit defined by the general formula (I) should be one defined by the formula (V);

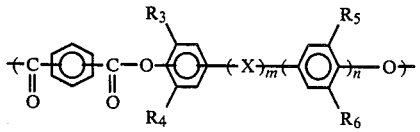

(V)

wherein

X, m, n=same as aforesaid $R_3$to $R_6$=$C_1$–$C_4$ alkyl, alkoxyl or phenyl.

The acid components to be used in the present invention may be derived from terephthalic acid or isophthalic acid. Aromatic rings may have substituents.

The bisphenol components to be used in the present invention may be derived from the general formula (IX) or (X);

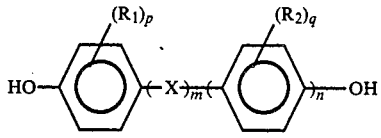

(IX)

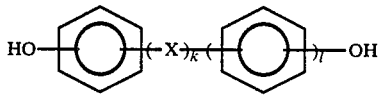

(X)

wherein X, $R_1$,$R_2$, p, q, m, n, k or l=same as aforesaid.

More preferably, the compounds defined by the formula (IX) should be those defined by the formula (XI)

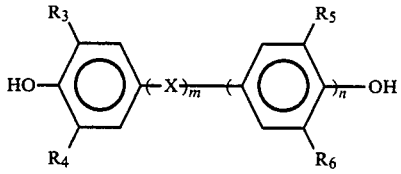

(XI)

wherein X, m, n, $R_3$ to $R_6$=same as aforesaid.

Examples of the divalent phenol (VI) are bis (4-hydroxyphenyl) methane, 1,1-bis (4-hydroxyphenyl) ethane, 2,2-bis (4-hydroxyphenyl) propane, bis(4-hydroxyphenyl) sulfon, bis(4-hydroxyphenyl)ketone, 4,4'-dihydroxydiphenylether and 4,4'-dihydroxydiphenylsulfide). Examples of the divalent phenol (X) are 2,2-bis (3,5-dimethyl-4-hydroxyphenyl)propane, 2,2-bis (3,5-di-sec-butyl-4-hydroxyphenyl)propane, bis(3,5-dimethyl-4-hydroxyphenyl)methane, 1,1-bis(3,5-dimethyl-4-hydroxyphenyl)ethane, 1,1-bis(3,5-dimethyl-4-hydroxyphenyl)cyclohexane, bis(3,5-dimethyl-4-hydroxyphenyl)sulfon, bis(3,5-dimethyl-4-hydroxyphenyl)ketone, bis(3,5-dimethyl-4-hydroxyphenyl)ether, bis(3,5-dimethyl-4-hydroxyphenyl)sulfide, 2,2-bis(3,5-dimethyl-4-hydroxyphenyl)hexafluoropropane, 2,2-bis(3,5-dimethoxy-4-hydroxyphenyl)propane, bis(3,5-dimethoxy-4-hydroxyphenyl)methane, 2,2-bis(3-methoxy-4-hydroxy-5-methylphenyl)propane, bis(3-methoxy-4-hydroxy-5-methyphenyl)methane, bis(3,5-diphenyl-4-hydroxyphenyl) methane, 2,2-bis(3,5-diphenoxy-4-hydroxyphenyl)propane, bis(3-phenoxy-4-hydroxy-5-methyl)methane, 4,4'-dihydroxy-3,3',5,5'-tetramethylbiphenyl and 4,4'-dihydroxy-3,3',5,5'-tetraetylbiphenyl.

In addition, condensed polycyclic disphenols such as dihydroxynaphthalene and dihydroxyanthracene; bisphenolic dyes and pigments such as alizarin, phenolphthalein, fluorescein, naphtophthalein, thymolphthalein, aurin, phenolsulfophthalein and dibromophenolsulfophthalein; dinaphthyl compounds such as 2,2'-dihydroxy-1,1'-dinaphthylmethane, 4,4'-dihydroxydinaphthyl-1,1', 2,2'-dihydroxydinaphthyl-1,1', 1,1'-bis(4-hydroxynaphthyl)-2,2,2-trichloroethane and 2,2'-dihydroxydinaphthylphenyl-methane may be partly substituted for bisphenols.

Usually, monofunctional compounds may further be used for the adjustment of molecular weight. Examples of the monofunctional compound are monophenols such as phenol, methoxyphenol, t-butylphenol, octylphenol and nonylphenol; monothiophenols; acid chlorides and amines.

The molecular weight of the polymers should preferably be 0.4 to 0.8 in terms of $\eta sp/c$ (32 ° C., chloroform, 0.32 dl/g).

In aromatic polyesters such as defined by the foregoing structure, the component defined by the formula (XI) impart superior water-resistancy and alkali-resistancy as compared with conventional aromatic polyesters. The aromatic polyesters, however, have a drawback that shaped articles are discolored and, in consequence, inferior in long-term heat resistancy and durability because of poor flowability upon molding, though possessing high heat distortion temperature.

The phosphite compounds to be used in the present invention may have the general formula (VI);

$$(R_7O)_3\,P \text{ or } (R_7O)_2P—OR_8—O—P—OR_7)_2 \qquad (VI)$$

wherein $R_7 = C_8–C_{30}$ alkyl, cycloalkyl, aryl, arylalkyl or alkylaryl $R_8 = C_1–C_{50}$ aromatic or aliphatic.

The phosphite compounds may be more preferable when $R_7$ is $C_8–C_{30}$ aryl or alkylaryl, or when defined by the general formula (VII);

$$—R_9—O—P(OR_{10})—O)_n \qquad (VII))$$

wherein $R_9$ = same with $R_8$ $R_{10}$ = same with $R_7$ n = integer of 3–50.

Examples of the phosphite compound defined by the formula (VI) are tridecylphosphite, triisodecylphosphite, tris(tridecylphosphite), phenyl(didecylphosphite), phenyldi(tridecyl)phosphite, diphenyloctylphosphite, diphenyldecylphosphite, diphenyltridecylphosphite, tris(nonylphenyl)phosphite, di(dinonylphenyl)-nonylphenylphosphite, tris(di-t-butylphenyl)phosphite, tetraphenyldipropyleneglycoldiphosphite, 4,4'-butylidene-bis(3-methyl-6-t-butylphenyl-didodecylphosphite, tetra(tridecyl)-4,4'-isopropylidenediphenyldiphosphite. Moreover, the phosphite compounds defined by the following general formulae may also be used;

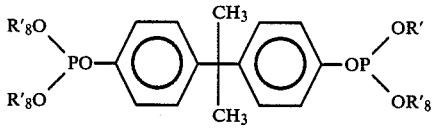

wherein

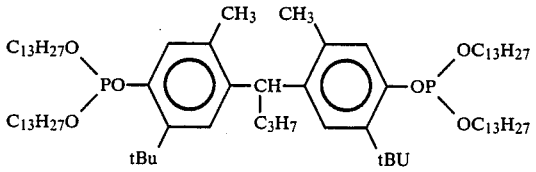

-continued

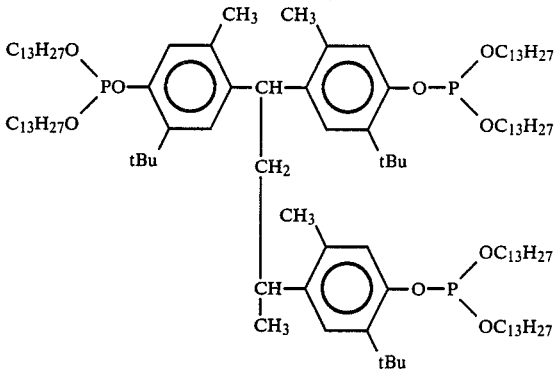

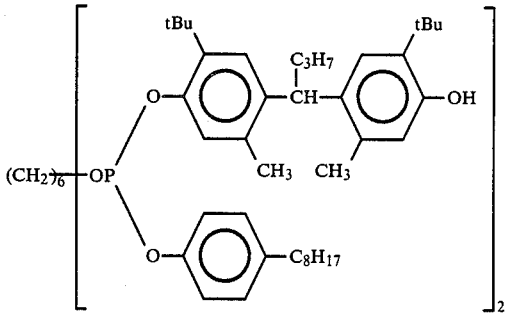

Typically, an example defined by the general formula (VII) is a hydrogenated bisphenol A phosphite polymer.

An amount of the phosphite compound in the present invention is 0.01 to 5 parts by weight based on 100 parts by weight of the aromatic polyester. In the case of less than 0.01 part by weight, satisfactory results are not provided, and in the case of exceeding 5 parts by weight, heat distortion temperature decteases to thus damage properties inherent in the resin.

The carboxylic acid metal salts to be used in the present invention are metal salts of $C_7–C_{30}$ aliphatic or aromatic carboxylic acids and metals belonging to II to IV group of the short periodic table of elements. Preferable carboxylic acids are $C_{11–C_{23}}$ aliphatic carboxylic acids, including such as lauric acid, myristic acid, palmitic acid, stearic acid, behenic acid, linolic acid, oleic acid and erucic acid. Preferable metals are, for example, calcium, barium, zinc, lead, tin and cadmium.

An amount of the carboxylic acid metal salt in the present invention is 0.01 to 0.1 part by weight based on 100 parts by weight of the aromatic polyester, with which discoloration upon molding can be sufficiently prevented. With an amount less than 0.1 part by weight, a marked effect is not expected and with an amount exceeding 0.1 part, chemical resistance, particularly, organic solvent resistance is lost.

When shaped articles are prepared from the composition of the present invention, the aromatic polyester is, at first, admixed under heat with the phosphite compound, then the obtained admixture being pelletized. Thereafter, the resulting pellets and the carboxylic acid metal salt are admixed under heat, then shaped by injection molding, extrusion molding and so on. It has been discovered that the above process can reduce an amount of each additive as shown by examples, or can use a polymer of higher molecular weight when the same amount of additives are added, as compared with cases where all the components are admixed upon pelletizing.

As a rule, aromatic polyester shaped articles become improved in properties such as heat resistancy and chemical resistancy, as the amount of additives decreases and the molecular weight of the polymer is high. The reason why outstanding results can be obtained with the compositions of the present invention is not always made clear, but presumably the phosphite compound not only prevents discoloration, but acts as an inner lubricant, while the carboxylic acid metal salt acts as an outer lubricant.

One of features of the present invention is, as stated above, to add those additives stepwise to the aromatic polyester. The admixing of the phosphite compound with the aromatic polyester is accomplished by use of a U type blender, a Henshel mixer, a Super mixer, a kneader, etc. The admixing of the pellets with the carboxylic acid metal salt is attained by use of a ribbon blender, etc.

The compositions of the present invention may further contain a small amount of additives such as an antioxidant, an age register and a light stabilizer, with a view to improving heat resistancy, weatherability, oxidation resistancy, etc. To impart flame retardancy to the compositions, various known flame retardants may be added. Moreover, inorganic fibers such as glass fiber and metallic whisker, carbon fibers, organic fibers, etc. may be added to reinforce the compositions. Coloring by addition of dyes and pigments is, of course, possible and addition of inorganic fillers is also possible. Moreover, it is also possible to provide compositions endowed with a variety of characteristics by blending with other resins.

Aromatic polyester compositions thus obtained are subjected to molding or shaping and have a widespread use as shaped articles, films or sheets in mechanical parts, electrical parts and the like.

Hereinafter, the present invention will be explained in more detail by way of examples and comparative examples that follow, to which the invention is in no way limited.

REFERENCE EXAMPLE 1

221.18 g of bisphenol A, 124.57 g of 3,3',5,5'-tetramethylbisphenol F, 9.97 g of paramethoxyphenol, 2.64 g of sodium hydrosulfite, 960 ml of 4N-NaOH and 1660 ml of deionized water were admixed under a nitrogen atmosphere in a 3 l flask and cooled to 2° C. to obtain an aqueous alkali solution of bisphenol.

On the other hand, in another 3 l flask 274.05 g of terephthalic acid chloride and 30.45 g of isophthalic acid chloride were dissolved under a nitrogen atmosphere in 2500 ml of methylene chloride and cooled to 2° C.

Into an 8 l separable flask, 1000 ml of deionized water and 0.47 g of benzil tributyl ammonium chloride serving as a catalyst were charged under a nitrogen atmosphere and cooled similarly.

The foregoing two liquids were respectively added by pumps continuously with violent stirring over 800 seconds into the 8 l separable flask. After 5 hours from the termination of addition, the reaction product was added into 100 ml of methylene chloride containing 4.22 g of benzoyl chloride. When stirring was stopped after 20 minutes, the contents were separated after about 10 minutes into two layers, i.e., a methylene chloride solution containing a polymer and an aqueous solution containing common salt and caustic soda. After the aqueous layer having been decanted, the same amount of water was added and the contents were neutralized with stirring with a small amount of hydrochloric acid. After desalting by washing was repeated, into the methylene chloride solution was the same amount of acetone added gradually to precipitate the polymer, which was recovered as powder. The obtained polymer had the molecular weight of 0.70 in terms of $\eta sp/c$ (32° C., chloroform, 0.32 dl/g).

EXAMPLES 1 ~ 7, COMPARATIVE EXAMPLES 1 ~ 3

100 parts by weight of the polymers prepared according to Reference Example 1 were blended by a Henshel mixer with phosphite compounds as set forth in Table 1 and the blends were extruded at 330° C. to give pellets. Thereafter, carboxylic acid metal salts listed up in Table 1 were uniformly blended with the pellets, then subjected to injection molding at 360° C. to prepare test pieces (dumbbell No. 1). These dumbbells were tested for heat deterioration by placing them in a gear oven heated to 160° C. Similar test was also conducted in a saturated steam of 90° C. The results were shown in Table 1.

TABLE 1

| | Additives (Parts by wt) | | Tensile strength (kg/cm$^2$) | | Coloring | | |
|---|---|---|---|---|---|---|---|
| | Phosphite | Carboxylic acid salt | Immediately after molding | After (a) aging | Immediately after molding | After aging | Moisture (b) resistance |
| Example | | | | | | | |
| 1 | $P_1$ (0.5) | $C_1$ (0.05) | 750 | 750 | Pale yellow | Yellow brown | |
| 2 | $P_2$ (0.5) | $C_1$ (0.1) | 750 | 760 | Pale yellow | Yellow brown | |
| 3 | $P_2$ (0.5) | $C_2$ (0.1) | 750 | 800 | Pale yellow | Yellow brown | |
| 4 | $P_1$ (1) | $C_1$ (0.07) | 750 | 800 | Pale yellow | Yellow | |
| 5 | $P_1$ (0.1) | $C_1$ (0.05) | 750 | 720 | Pale yellow | Pale brown | |
| 6 | $P_1$ (3) | $C_1$ (0.05) | 750 | 750 | Pale yellow | Pale yellow | |
| 7 | $P_3$ (0.5) | $C_2$ (0.1) | 750 | 550 | Pale yellow | Yellow brown | |
| Comp. Ex. | | | | | | | |
| 1 | 0 | 0 | | (Molding is impossible) | | | |
| 2 | $P_1$ (0.5) | 0 | 750 | 350 | Yellow | Brown | Δ |
| 3 | 0 | $C_1$ (0.7) | 750 | 290 | Pale yellow | Black brown | X |

As is apparent from the results of Table 1, Examples 1 ~ 7 are all superior in tensile strength after aging, as compared with Comparative Examples 2 ~ 3, and also excellent in moisture resistance. Example 7 which employed a cyclic phosphite is somewhat insufficient in tensile strength after aging. With a carboxylic acid metal salt alone, at least 0.7 part by weight was required to ensure molding, as shown by Comparative Example 3.

Test conditions;

(a) 160° C., 7 days, in a gear oven
(b) 90° C., 3 days, in a saturated steam
Criteria of moisture resistance;
: Neither creases nor cracks are observed
: A small number of creases or cracks are observed
Δ: A fairly number of cracks are observed
X: A great number of cracks are observed
Additives;

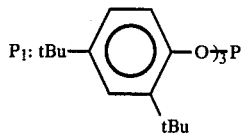

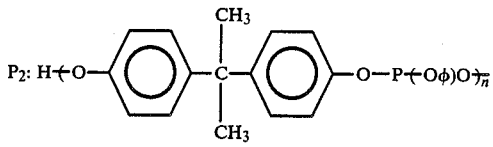

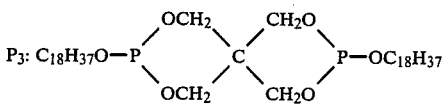

$C_1$: Magnesium stearate
$C_2$: Calcium stearate

REFERENCE EXAMPLE 2

An aromatic polyester was prepared in a similar manner to that of Reference Example 1, except that 138.2 g of 3,3',5,5'-tetramethylbisphenol A was used in place of 124.57 g of tetramethylbisphenol F. The obtained polymer exhibited 0.68 in terms of ηsp/c (32° C., chloroform, 0.32 dl/g).

EXAMPLES 8~9, COMPARATIVE EXAMPLE 4

With 100 parts by weight of the polymers prepared by reference Example 2, phosphite compounds and carboxylic acid metal salts as set forth in Table 2 were blended.

Test samples were prepared using the blends and supplied for the test, similarly to Examples 1~7. Table 2 shows the results.

TABLE 2

| | Additives (Parts by wt) | | Tensile strength (kg/cm²) | | Coloring | | |
|---|---|---|---|---|---|---|---|
| | Phosphite | Carboxylic acid salt | Immediately after molding | After (a) aging | Immediately after molding | After aging | Moisture (b) resistance |
| Example | | | | | | | |
| 8 | $P_1$ (1) | $C_1$ (0.07) | 780 | 800 | Pale yellow | Pale brown | |
| 9 | $P_1$ (3) | $C_1$ (0.05) | 780 | 780 | Pale yellow | Yellow | |
| Comp. Ex. 4 | $P_1$ (1) | 0 | 760 | 250 | Pale yellow | Brown | Δ |

What is claimed is:

1. A resinous composition having improved discoloration, processability, heat resistancy and durability comprising:

A. 100 parts by weight of an aromatic polyester containing recurring structural units of the general formulae (I) and (II),

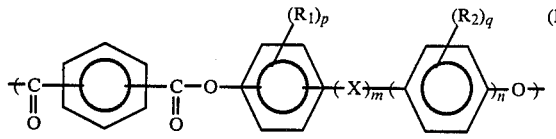

(I)

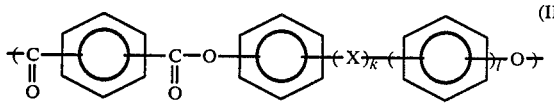

(II)

wherein
$X = C_1$–$C_{10}$ alkylene, $C_5$–$C_{15}$ cycloalkylene or cycloalkylidene, —O—, —S—, —CO— or —$SO_2$—
$R_1, R_2 = C_1$–$C_{20}$ alkyl, aryl, ararkyl, alkoxyl, aryloxyl or arylalkoxyl
p, q; p+q=integer of 1 to 8 ($1 \leqq p, q \leqq 4$)
m, n=0 or 1 (if m=1, n≠0)
k, l=0 or 1 (if k=1, l≠0), and
molar ratio (I)/(I)+(II)=1–0.01, B. 0.01 to 5 parts by weight of a phosphite compound having general formula (VI);

$$(R_7O)_3P \text{ or } (R_7O)_2P—OR_8—O—P—OR_7)_2 \quad \text{(VI)}$$

wherein
$R_7 = C_8$–$C_{30}$ alkyl, cycloalkyl, aryl, arylalkyl or alkylaryl
$R_8 = C_1$–$C_{50}$ aromatic or aliphatic (each substituent may or may not be the same),
or wherein the phosphite compound comprises an oligomer or a polymer having the general formula;

$$—R_9—O—P\ (OR_{10})—O—_n \quad \text{(VII)}$$

wherein
$R_9$=same as $R_8$
$R_{10}$=same as $R_7$
n=integer of 3–50.

C. 0.01 to 0.1 part by weight of a carboxylic acid metal salt.

2. The resinous composition of claim 1, wherein molar ratio of (III)/(III)+(IV) contained in the aromatic polyester ranges from 1 to 0.1;

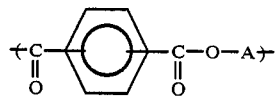

(III)

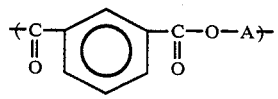

(IV)

wherein A=bisphenol residue.

3. The resinous composition of claim 2, wherein the molar ratio of (III)/(III)+(IV) ranges from 1 to 0.4.

4. The resinous composition of claim 2, wherein the molar ratio of (III)/(III)+(IV) ranges from 1 to 0.9.

5. The resinous composition of claim 1, wherein the general formula (I) is defined by general formula (V);

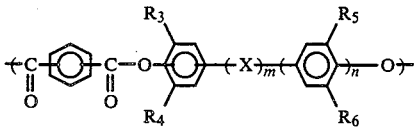

(V)

wherein

X, m, n=same as aforesaid $R_3$ to $R_6$=$C_1$-$C_4$ alkyl, alkoxyl or phenyl.

6. The resinous composition of claim 1, wherein the aromatic polyester has a specific viscosity of from 0.4 to 0.8 dl/g (32° C., chloroform).

7. The resinous composition of claim 1, wherein $R_7$ of the phosphite compound (VI) is $C_8$-$C_{30}$ aryl or alkylaryl.

8. The resinous composition of claim 1, wherein the carboxylic acid used as the carboxylic acid metal salt has the general formula (VII);

$$R_{11}CO_2H \qquad \text{(VIII)}$$

wherein $R_{11}$=$C_7$-$C_{30}$ aliphatic or aromatic.

9. The resinous composition of claim 8, wherein the carboxylic acid is $C_{11}$-$C_{23}$ saturated or unsaturated carboxylic acid.

10. The resinous composition of claim 1, wherein the metal used as the carboxylic acid metal salt belongs to II to IV group of the short periodic table of elements.

11. A process for producing shaped articles having excellent heat resistancy and durability comprising steps of blending 100 parts by weight of an aromatic polyester containing recurring structural units of the general formulae (I) and (II) with 0.01 to 5 parts by weight of a phosphite compound, admixing the blend under heat uniformly, extruding and pelletixing the resulting blend, blending the resulting pellets with a carboxylic acid metal salt, and molding the resulting blend;

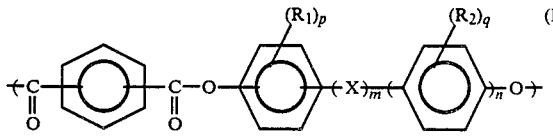

(I)

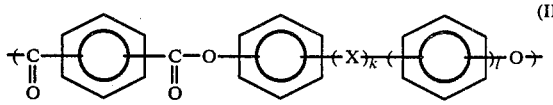

(II)

wherein

X=$C_1$-$C_{10}$ alkylene, $C_5$-$C_{15}$ cycloalkylene or cycloalkylidene, —O—, —S—, —CO— or —$SO_2$—

$R_1$,$R_2$=$C_1$-$C_{20}$ alkyl, aryl, ararkyl, alkoxyl, aryloxyl or arylalkoxyl p, q; p+q=integer of 1 to 8 ($1 \leqq p, q \leqq 4$)

m, n=0 or 1 (if m=1, $n \neq 0$)

k, l=0 or 1 (if k=1, $l \neq 0$), and molar ratio (I)/(I)+(II)=1-0.01.

12. The process of claim 11 wherein said phosphite compound has the general formula (VI);

$$(R_7O)_3P \text{ or } (R_7O)_2P—OR_8—O—P—OR_7)_2 \qquad \text{(VI)}$$

wherein $R_7$=$C_8$-$C_{30}$ alkyl, cycloalkyl, aryl, arylalkyl or alkylaryl $R_8$=$C_1$-$C_{50}$ aromatic or aliphatic (each substituent may or may not be the same), or wherein the phosphite compound comprises an oligomer or a polymer having the general formula;

$$—R_9—O—P(OR_{10})—O)_n \qquad \text{(VII)}$$

wherein $R_9$=same as $R_8$ $R_{10}$=same as $R_7$ n=integer of 3-50.

* * * * *